United States Patent [19]

Ho et al.

[11] Patent Number: 4,831,002

[45] Date of Patent: * May 16, 1989

[54] CR-PROMOTED HYDROTREATING CATALYSTS

[75] Inventors: Teh C. Ho, Bridgewater; Larry E. McCandlish, Highland Park; Archie R. Young, II, Montclair; Edward J. Osterhuber, Phillipsburg, all of N.J.

[73] Assignee: Exxon Research and Engineering Company, Florham Park, N.J.

[ * ] Notice: The portion of the term of this patent subsequent to Dec. 29, 2004 has been disclaimed.

[21] Appl. No.: 79,247

[22] Filed: Jul. 29, 1987

Related U.S. Application Data

[63] Continuation-in-part of Ser. No. 849,867, Apr. 9, 1986, abandoned, which is a continuation-in-part of Ser. No. 680,379, Dec. 11, 1984, Pat. No. 4,595,672, which is a continuation-in-part of Ser. No. 603,834, Apr. 25, 1984, abandoned, which is a continuation of Ser. No. 454,220, Dec. 29, 1982, abandoned.

[51] Int. Cl.$^4$ .............................................. B01J 31/22
[52] U.S. Cl. .................................... 502/165; 502/167; 502/219; 502/220; 502/221
[58] Field of Search ............... 502/165, 167, 219, 220, 502/221

[56] References Cited

U.S. PATENT DOCUMENTS

| | | | |
|---|---|---|---|
| 4,278,566 | 7/1981 | Hensley et al. | 502/220 |
| 4,595,672 | 6/1986 | Ho et al. | 502/219 |
| 4,632,747 | 12/1986 | Ho et al. | 502/219 X |
| 4,716,139 | 12/1987 | Jacobson et al. | 502/220 X |

*Primary Examiner*—Patrick P. Garvin
*Attorney, Agent, or Firm*—Joseph J. Dvorak

[57] ABSTRACT

Self-promoted molybdenum and tungsten sulfide hydrotreating catalysts are prepared by heating one or more water soluble catalyst precursors in a non-oxidizing atmosphere in the presence of sulfur at a temperature of at least about 200° C. The precursors are $(Cr_xM_{1-x}L)[Mo_yW_{1-y}O_4]_{1+.5x}$ wherein M is a divalent promoter metal selected from the group consisting of Mn, Fe, Co, Ni, Cu, Zn and mixtures thereof, x is any value from about 0.2 to 1, y is any value from 0 to 1, and wherein L is a nitrogen-containing, neutral multidentate, chelating ligand. In a preferred embodiment the lligand L will comprise one or more chelating alkyl di- or triamines and the non-oxidizing atmosphere will comprise $H_2S$.

8 Claims, No Drawings

CR-PROMOTED HYDROTREATING CATALYSTS

This application is a continuation-in-part of application Ser. No. 849,867 (abandoned) filed Apr. 9, 1986, which is a continuation-in-part of application Ser. No. 680,379) (now U.S. Pat. No. 4,595,672) filed Dec. 11, 1984, which is a continuation-in-part of U.S. application Ser. No. 603,834 (abandoned) filed Apr. 25, 1984, which is a Rule 60 continuation of U.S. Ser. No. 454,220 filed Dec. 29, 1982 (abandoned).

FIELD OF THE INVENTION

This invention relates to self-promoted molybdenum and tungsten sulfide hydrotreating catalysts. More particularly, this invention relates to self-promoted molybdenum and tungsten sulfide hydrotreating catalysts produced by heating one or more water soluble molybdate and/or tungstate catalyst precursors containing the promoter trivalent chromium in the presence of sulfur at elevated temperature for a time sufficient to form said self-promoted catalyst. Optionally, another promoter metal selected from the group consisting of Ni, Co, Mn, Cu, Zn, and mixtures thereof is part of the precursor molecule.

BACKGROUND OF THE INVENTION

The petroleum industry is increasingly turning to coal, tar sands, heavy crudes and resids as sources for future feedstocks. Feedstocks derived from these heavy materials contain more sulfur and nitrogen than feedstocks derived from more conventional crude oils. Such feedstocks are commonly referred to as being dirty feeds. These feeds therefore require a considerable amount of upgrading in order to obtain usable products therefrom, such upgrading or refining generally being accomplished by hydrotreating process which are well known in the industry.

These processes require the treating with hydrogen of various hydrocarbon fractions, or whole heavy feeds, or feedstocks, in the presence of hydrotreating catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle or heavy distillate feeds and residual feeds, or fuels. In hydrotreating relatively light feeds, the feeds are treated with hydrogen, often to improve such compounds in the presence of hydrogen, which processes are collectively known as hydrotreating or hydrorefining processes, it being understood that hydrorefining also includes some hydrogenation of aromatic and unsaturated aliphatic hydrocarbons. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603, discloses the use of molybdenum sulfide as a catalyst for the hydrogenation of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. Molybdenum and tungsten sulfides have other uses as catalysts, including hydrogenation, methanation, water gas shift, etc. reactions.

In general, with molybdenum and other transition metal sulfide catalysts as well as with other types of catalysts, higher catalyst surface areas generally result in more active catalysts than similar catalysts with lower surface areas. Thus, those skilled in the art are constantly trying to achieve catalysts that have higher surface areas. More recently, it has been disclosed in U.S. Pat. Nos. 4,243,553 and 4,243,554 that molybdenum sulfide catalysts of relatively high surface area may be obtained by thermally decomposing selected thiomolybdate salts at temperatures ranging from 300° to 800° C. in the presence of essentially inert, oxygen-free atmospheres. Suitable atmospheres are disclosed as consisting of argon, a vacuum, nitrogen and hydrogen. In U.S. Pat. No. 4,243,554, an ammonium thiomolybdate salt is decomposed at a rate in excess of 15° C. per minute, whereas in U.S. Pat. No. 4,243,553, a subtituted ammonium thiomolybdate salt is thermally decomposed at a very slow heating rate of from about 0.5 to 2° C./min. The processes disclosed in these patents are claimed to produce molybdenum disulfide catalysts having superior properties for water gas shift and methanation reactions and for catalyzed hydrogenation or hydrotreating reactions.

SUMMARY OF THE INVENTION

Self-promoted molybdenum and tungsten sulfide hydroprocessing catalysts are obtained by heating one or more water soluble catalyst precursors of the formula $(Cr_xM_{1-x}L)[Mo_yW_{1-y}O_4]_{1+.5x}$ in a non-oxidizing atmosphere in the prsence of sulfur at a temperature of at least about 200° C. for a time sufficient to form said catalyst, wherein M is one or more divalent promoter metals selected from the group consisting of Mn, Fe, Co, Ni, Cu, Zn and mixtures thereof, x is any value from about 0.2 to 1, y is any value ranging from 0 to 1, and wherein L is one or more neutral, nitrogen-containing ligand at least one of which is a chelating polydentate ligand. In a preferred embodiment, ligand L will have a denticity of six and will be either three bidentate or two tridentate chelating, alkyl amine ligands, and the non-oxidizing atmosphere will contain hydrogen sulfide as the source of sulfur.

Hydroprocessing is meant to include any process that is carried out in the presence of hydrogen, including, but not limited to, hydrocracking, hydrodenitrogenation, hydrodesulfurization, hydrogenation of aromatic and aliphatic unsaturated hydrocarbons, methanation, water gas shift, etc. These reactions include hydrotreating and hydrorefining reactions, the difference generally being thought of as a difference in degree than in kind, with hydrotreating conditions being more severe than hydrorefining conditions.

The catalysts of this invention may be used in bulk form or supported on a suitable inorganic refractory oxide support such as alumina. A particularly significant advantage of this invention is that the water solubility of the catalyst precursor permits the precursor to be impregnated onto a suitable support such as alumina, via conventional impregnation techniques such as incipient wetness and adsorption.

DETAILED DESCRIPTION OF THE INVENTION

As hereinbefore stated, the catalyst precursor is a water soluble metallate having the formula $(Cr_xM_{1-x}L)[Mo_yW_{1-y}O_4]_{1+.5x}$ wherein x is any value from about 0.2 up to and including 1 and y is any value between and including 0 and 1. The precursor may be a self-promoted molybdate, tungstate or combination thereof. If it is a molybdate, it is obvious that y will have a value of 1. Alternatively, if the precursor is a tungstate, y will be zero.

The ligand L will generally have a denticity of six and will be one or more neutral, nitrogen-containing ligands wherein at least one of said ligands is a multidentate chelating ligand which chelates the promoter metal cation to form a chelated promoter metal cation $[CrL]^{+3}$. Thus, the catalytic metal oxide anion $(Mo_yW_{1-y}O_4)^{2-}$ will be ionically bound to the chelated promoter metal cation $[CrL]^{+3}$. By neutral is meant that the ligand itself does not have a charge.

Those skilled in the art know that the term "ligand" is used to designate functional coordinating groups which have one or more pairs of electrons available for the formation of coordinate bonds. Ligands that can form more than one bond with a metal ion are called polydentate while ligands that can form only one bond with a metal ion are called monodentate. Monodentate ligands are not capable of forming chelates. Hence, if one uses one or more species of monodentate ligands in the precursor molecule, then one must also use at least one polydentate chelating ligand. Preferably, L will be one or more polydentate chelating ligands. The denticity of the ligand L will generally be six, because the promoter metal cations prefer six-fold coordination. Hence, if more than one species of ligand is employed in the precursor molecule, the denticity of the ligand species will usually add up to six. It should be understood that it is possible for ligand L to have a total denticity of less than six, but in most cases L will have a total denticity of six. Thus, L will be three bidentate ligands, two tridentate ligands, a mixture of a bidentate and a quadridentate ligand, a hexadentate ligand or a mixture of a polydentate ligand with monodentate ligands as long as the combination has a total denticity of six. As has heretofor been stated, it is preferred to use chelating bidentate and tridentate ligands. In general, the ligands useful in this invention include alkyl and aryl amines and nitrogen heterocycles. Illustrative but non-limiting examples of ligands useful in the catalyst precursors of this invention are set forth below.

Monodentate ligands will include $NH_3$ as well as alkyl and aryl amines such as ethyl amine, dimethyl amines, pyridine, etc. Useful chelating bidentate amine ligands are illustrated by ethylenediamine, 2,2'-bipyridine, 1,10-phenylene bis(dimethyl-amine), o-phenylene diamine, tetramethylethylenediamine and propane-1,3 diamine. Similarly, useful chelating tridentate amine ligands are represented by terpyridine and diethylenetriamine while triethylenetetramine is illustrative of a useful chelating quadradentate amine ligand. Useful chelating pentadentate ligands include tetraethylenepentamine while sepulchrate (an octazacryptate) is illustrative of a suitable chelating hexadentate ligand. However, as a practical matter it will be preferred to use chelating, polydentate alkyl amines for L. Illustrative but not limiting examples of alkyl amines that are useful in the catalyst precursor of this invention include ethylenediamine, diethylenetriamine, and tetraethylenetetramine. It is particularly preferred to use bidentate and tridentate alkyl amines such as ethylenediamine and diethylenetriamine.

In general, the precursor salts useful for forming the catalysts of this invention may be prepared by mixing an aqueous solution of ammonium molybdate and/or tungstate with an aqueous solution of chelated promoter metal cation $[CrL]^{+3}$ which, in the presence of excess metallate, ligand and/or chelated promoter metal cation, will result in the formation of the precursor salt as a precipitate which is readily recovered. The chelating promoter cation is easily formed by, for example, mixing an aqueous solution of one or more water soluble promoter metal salts with the ligand. The water soluble salt may be any water soluble salt that is convenient to use such as a halide, sulfate, perchlorate, acetate, nitrate, etc. Alternatively, an aqueous solution of ammonium molybdate and/or tungstate may be mixed with the ligand with the resulting solution mixed with an aqueous solution of promoter metal salt or the salt can be added to the ligand and dissolved into the solution of molybdate and/or tungstate. The catalyst precursor preparation will be further understood by reference to the Examples, infra.

The catalysts of this invention may be used in bulk or supported on a suitable support, preferably supported on a suitable inorganic refractory oxide support such as alumina. As previously stated, an advantage of the catalyst precursors useful in this invention resides in their water solubility which permits them to be supported on suitable support materials by techniques well known in the art, such as impregnation, incipient wetness and the like, the choice being left to the convenience of the practitioner. When using the impregnation technique, the aqueous impregnating solution will be contacted with the support for a time sufficient to deposit the precursor material onto the support either by selective adsorption or, alternatively, the excess water may be evaporated during drying, leaving behind the precursor salt. Advantageously, the incipient wetness techniques may be used whereby just enough of an aqueous precursor salt solution is added to dampen and fill the pores of the support.

The catalysts of this invention may be prepared by heating one or more catalyst precursor salts, bulk or supported, in the presence of sulfur in a non-oxidizing atmosphere, at a temperature of at least about 200° for a time sufficient to form the catalyst. Preferably, the sulfur required during the formation of the catalyst will be present in the form of a sulfur-bearing compound and in an amount in excess of that required to form the catalyst. Thus, it is preferred that the catalyst be formed by heating the precursor in the presence of sulfur or, preferably in the presence of a sulfur-bearing compound which can be one or more solids, liquids, gases or mixtures thereof which are capable of reacting with hydrogen to form the sulfide thereof. Mixtures of hydrogen and $H_2S$ have been found to be particularly preferred. Preferably, the temperature will range between from about 250° C. to 600° C., more preferably from about 250° C. to 500° C. and still more preferably from about 300° C. to 450° C. The non-oxidizing atmosphere may be inert or net reducing.

As discussed above, molybdenum and tungsten sulfide catalysts have many uses, including hydrotreating. Hydrotreating conditions vary considerably depending on the nature of the hydrocarbon being hydrotreated, the natures of the impurities or contaminants to be reacted or removed, and, inter alia, the extent of conversion desired, if any. In general, however, the following are typical conditions for hydrotreating a naphtha boiling within a range of from about 25° C. to about 210° C., a diesel fuel boiling within a range of from about 170° C. to 350° C., a heavy gas oil boiling within a range of from about 325° C. to about 475° C., a lube oil feel boiling within a range of from about 290° C. to 500° C., or residuum containing from about 10 percent to about 50 percent of material boiling above about 575° C.

| Feed | | Temperature, °C. | Pressure, psig | Space Velocity, V/V/Hr | Hydrogen Gas Rate, SCF/B |
| --- | --- | --- | --- | --- | --- |
| Naphtha | Typical | 100–370 | -150–800 | 0.5–10 | 100–2,000 |
| Diesel | Typical | 200–400 | 250–1500 | 0.5–6 | 500–6,000 |
| Heavy | Typical | 260–430 | 250–2500 | 0.3–4 | 1,000–6,000 |
| Lube Oil | Typical | 200–450 | 100–3000 | 0.2–5 | 100–10,000 |
| Residuum | Typical | 340–450 | 1000–5000 | 0.1–2 | 2,000–10,000 |

The invention will be further understood by reference to the following examples.

EXAMPLES

Catalyst Precursor Preparation

Example 1

A catalyst precursor of composition, $Cr(H_2NCH_2CH_2NH_2)_3(MoO_4)_{1.5}$ was prepared as follows: 16.1 g $Cr(H_2NCH_2CH_2NH_2)_3Cl_3.3.5H_2O$ (Alfa Products Division, Morton Thiokol, Inc.) were dissolved in 50 ml water (Solution I). 10.9 g ammonium paramolybdate $[(NH_4)_6Mo_7O_{24}.4H_2O]$ were dissolved in 300 ml ethylenediamine $(H_2NCH_2CH_2NH_2)$, to which were added 25 ml $H_2O$ to form a clear solution (Solution II). When Solution I was added to Solution II, a bright yellow precipitate formed. This was recovered by vacuum filtration followed by washing with dry acetone. The solid was dried in a stream of dry $N_2$. It weighed 17.6 g (calculated for $Cr(H_2NCH_2CH_2NH_2)_3(MoO_4)_{1.5}$:18.9 g). Metals analysis by inductively coupled plasma emission spectroscopy (ICPES) yielded Cr, 9.17%; Mo, 27.2%. This gives an atomic ratio Cr:Mo of 1:1.52. An infrared spectrum of the solid as a KBr pellet shows a characteristic $MoO_4^{-2}$ peak at 820 cm$^{-1}$. $Cr(en)_3(MoO_4)_{1.5}$ (en=$NH_2CH_2CH_2NH_2$) is extremely soluble in water (>60%) yielding a red solution.

Example 2

37.8 g $Cr(en)_3(MoO_4)_{1.5}$ prepared as described in Example 1, were dissolved in 28 ml $H_2O$. 50 g of gamma-$Al_2O_3$ having a surface area of 165 m$^2$/g and a pore volume of 0.57 cc/g (28.5 cc/50 g) were impregnated with the 28 ml $Cr(en)_3(MoO_4)_{1.5}$ solution. The impregnated alumina was dried in a vacuum oven at 50° C. The dried powder was pressed into pellets which were, in turn, crushed and screened to yield a −20 +40 mesh fraction. The 20/40 mesh granules was sulfided in 10% $H_2S/H_2$ at 400° C. for three hours. This sulfided material, designated as Catalyst A, had the following metals content (wt. %): Cr, 5.53%; Mo, 15.3%; Al, 35.2%.

Example 3

25 g gamma $Al_2O_3$ (S.A.=165 m$^2$/g, P.V.=0.57 cc/g) were impregnated with 31.8 ml of aqueous solution containing 9.54 g $Ni(en)_3MoO_4$ and 11.28 g $Cr(en)_3.(MoO_4)_{1.5}$. The impregnated alumina was dried, sized to −20 +40 mesh and sulfided as described in Example 2. The sulfided powder is designated as Catalyst B and had the following metals content: Ni, 3.65%; Cr, 3.24%; Mo, 14.9%; Al, 34.6%.

Example 4

24.1 g $Cr(en)_3Cl_3$ $3.5H_2O$ and 17.5 g $Ni(NO_3)_2.6H_2O$ were dissolved in 100 ml $H_2O$, to which were added (while cooling in an ice bath) 50 ml ethylenediamine (Solution I). 26.5 g ammonium paramolybdate $[(NH_4)_6Mo_7O_{24}.4H_2O]$ were dissolved in 900 ml ethylenediamine plus 50 ml $H_2O$ (Solution II). Solution I was added to Solution II while stirring with a magnetic stirrer and cooling in an ice bath. This yielded a yellow-brown precipitate which was recovered by vacuum filtration, washing with dry acetone and drying in a stream of $N_2$. The yield was 52.2 g (calculated for $Ni_{0.5}Cr_{.5}(en)_3(MoO_4)_{1.25}$, 52.2 g). Infrared spectrum of the solid as KBr pellet shows $MoO_4^{-2}$ peak at 818 cm$^{-1}$.

A sample of $Ni_{0.5}Cr_{.5}(en)_3(MoO_4)_{1.25}$ was screened to yield a −20+40 mesh fraction, which was sulfided in 10% $H_2S/H_2$ at 400° C. The resulting sulfided powder, designated as Catalyst C, gave the following metals analysis: Ni, 10.2%; Cr, 9.41%; Mo, 43.1%.

Example 5

The catalysts designated, respectively, as Catalyst A (Example 2), Catalyst B (Example 3), and Catalyst C (Example 4) were evaluated on a heavy catalytic cycle oil (HCCO) containing 0.82% S and 0.11% N. The test was carried out in an automated, continuously stirred tank reactor unit consisting of a one liter autoclave, calibrated feed burette, pump, gas-liquid separator, and product liquid collector. Twenty cc of catalyst were charged in a stainless steel basket which was placed inside the autoclave. The test conditions were 325°, 3.15 MPa, 3000 SCF/B $H_2$, and 1.0 LHSV. Stirring rate was set at 1500 rpm to ensure the absence of mass transfer effects. The results, in terms of volumetric percent heteroatom removed, are summarized below:

| Catalyst | HDS (%) | HDN (%) |
| --- | --- | --- |
| Catalyst A | 35.4 | 43.0 |
| Catalyst B | 43.3 | 44.9 |
| Catalyst C | 50.0 | 57.3 |

Example 6

33.16 g $Cr(en)_3(MoO_4)_{1.5}$ prepared as described in Example 1 were dissolved in 93 ml of an aqueous solution containing 27.9 g $Ni(en)_3MoO_4$. The solution was evaporated in a Roto-Vap at 70° C. for 12 hours, and then heated under $N_2$ for at 250° C. for two hours. The residual solid $Cr_{0.5}Ni_{0.5}(en)_3[MoO_4]_{1.25}$ was sulfided in 10% $H_2S/H_2$ at 400° C. for three hours. The sulfided sample, designated as Catalyst D, had the following metals content: Ni, 10.6%; Cr, 9.28%; Mo, 42.6%.

Example 7

Catalyst D (Example 6) was sized to 20/40 mesh and 20 cc were tested on a light catalytic cycle oil (LCCO) having 0.67% S and 318 wppm N. The test was carried out in a trickle-bed plug flow reactor under the following conditions: 325° C., 3.15 MPa, 3000 SCF/B $H_2$, 3.0 LHSV. The test results expressed as volumetric percent heteroatom removal, are as follows:

| Catalyst | HDS (%) | HDN (%) |
|---|---|---|
| Catalyst D | 70.1 | 52.8 |

Example 8

4.49 g Ni(en)$_3$MoO$_4$, 5.32 g Cr(en)$_3$(MoO$_4$)$_{1.5}$, and 2.98 g ammonium paramolybate [(NH$_4$)$_6$Mo$_7$O$_{24}$.4H$_2$O] were dissolved in 50 ml H$_2$O. The resulting solution was used to impregnate 35 g of boehmitic Al$_2$O$_3$ (S.A.=340 m$^2$/g, P.V.=1.7 cc/g). The impregnated solid was dried in a vacuum oven at 50° C. and then treated with 10% H$_2$S/H$_2$ at 400° C. for three hours. The sulfided material, designated as Catalyst E, has the following metals content: Ni, 1.51%; Cr, 1.34%, Mo, 9.84%; Al, 42.15.

Example 9

The procedure described in Example 8 was followed, except that 4.49 g (0.0113 m) Co(en)$_3$MoO$_4$ was substituted for the Ni(en)$_3$MoO$_4$. The resulting sulfided catalyst contained 9.84% Mo and is designated Catalyst F.

Example 10

20 cc of 20/40 mesh samples of Catalysts E and F were tested on HCCO containing 0.89% S and 0.13% N and vacuum gas oil (VGO) containing 1.55% S and 0.53% N in respectively, low pressure and high pressure trickle-bed plug flow reactors. The results reported as volumetric percent heteroatom removal are as follows:

| Catalyst | HDS (%) | HDN (%) |
|---|---|---|
| HCCO Feed, 325° C., 3.15 MPa, 3000 SCF/B $H_2$, 3.0 LHSV | | |
| Catalyst E | 43.8 | 17.4 |
| Catalyst F | 56.2 | 23.5 |
| VGO Feed, 340° C., 7.5 MPa, 3000 SCF/B $H_2$, 1.0 LHSV | | |
| Catalyst E | 48.0 | 15.1 |
| Catalyst F | 56.0 | 15.1 |

Having thus described the invention by disclosure and by example, it should be apparent that various aspects of the invention as claimed below may be modified by various substitutions without departing from the spirit of the invention.

What is claimed is:

1. A method of preparing self-promoted molybdenum and tungsten sulfide catalysts comprising heating one or more catalysts precursors of the formula $(Cr_xM_{1-x}L)(Mo_yW_{1-y}O_4)_{1+1.5x}$ in a non-oxidizing atmosphere in the presence of sulfur at an elevated temperature of at least about 200° C. for a time sufficient to form said catalyst, wherein M is a metal selected from the group consisting of Mn, Fe, Co, Ni, Cu, Zn and mixtures thereof, wherein x is any value from about 0.2 to 1 and y is any value ranging from 0 to 1, and wherein L is one or more neutral, nitrogen-containing ligands at least one of which is a chelating polydentate ligand.

2. The method of claim 1 wherein said elevated temperature is in the range of from about 200° C. to about 600° C.

3. The method of claim 2 wherein said sulfur is in the form of one or more sulfur-bearing compounds.

4. The method of claim 3 wherein said sulfur is present as H$_2$S.

5. The method of claim 2 whereiin said non-oxidizing atmosphere comprises a mixture of H$_2$ and H$_2$S.

6. The method of claim 2 wherein said ligand is selected from the group consisting of alkyl amines, aryl amines, nitrogen heterocycles and mixtures thereof.

7. The method of claim 5 wherein said polydentate ligand L has a total denticity of six.

8. The method of claim 5 wherein said elevated temperature is between about 250° C. and about 500° C.

* * * * *